United States Patent [19]

Vallance et al.

[11] Patent Number: 4,755,588

[45] Date of Patent: Jul. 5, 1988

[54] COMPOSITION AND METHOD FOR CONTROLLING POLYMERIZATION RATE OF CYCLIC POLYCARBONATE OLIGOMER WITH ENCAPSULATED CATALYST

[75] Inventors: Michael A. Vallance, Schenectady; Thomas L. Evans, Clifton Park; John M. Kelly, Albany, all of N.Y.

[73] Assignee: General Electric Company, Schenectady, N.Y.

[21] Appl. No.: 899,375

[22] Filed: Aug. 22, 1986

[51] Int. Cl.[4] ............................................. C08G 63/62
[52] U.S. Cl. .................................... 528/371; 525/436; 525/439; 525/463; 525/534; 525/535; 528/196
[58] Field of Search ................ 528/371, 196; 525/436, 525/439, 463, 534, 535

[56] References Cited

U.S. PATENT DOCUMENTS 4,605,731  8/1986  Evans et al. ......................... 528/371
4,644,053  2/1987  Brunelle et al. ..................... 528/371

*Primary Examiner*—Harold D. Anderson
*Attorney, Agent, or Firm*—William H. Pittman; James C. Davis, Jr.; James Magee, Jr.

[57] ABSTRACT

The polymerization rate of a cyclic polycarbonate oligomer composition to linear polycarbonates is controlled by encapsulating a polycarbonate formation catalyst in a thermoplastic polymer which is soluble or stably dispersible in said oligomer compositions at elevated temperatures; blending the encapsulated catalyst with the oligomer composition under non-polymerization conditions; and heating the blend to a temperature at which polymerization takes place. Among the polymers suitable for encapsulating the catalyst are polyetherimides.

11 Claims, No Drawings

COMPOSITION AND METHOD FOR CONTROLLING POLYMERIZATION RATE OF CYCLIC POLYCARBONATE OLIGOMER WITH ENCAPSULATED CATALYST

This invention relates to the formation of linear polycarbonates from cyclic polycarbonate oligomers, and more particularly to a method for modifying the rate of the polymerization reaction leading to such formation.

The conversion of low molecular weight cyclic aromatic carbonate polymers to linear polycarbonates is known. Reference is made, for example, to the following U.S. patents: U.S. Pat. Nos. 3,155,683, 3,386,954, 3,274,214, 3,422,119. More recently, cyclic polycarbonate oligomer mixtures have been prepared and converted to linear polycarbonates, often of very high molecular weight, by contact with various polycarbonate formation catalysts. Reference is made to European patent application No. 162,379 and copending, commonly owned applications Ser. No. 704,122, filed Feb. 22, 1985 (now U.S. Pat. No. 4,644,053), Ser. No. 723,672, filed Feb. 22, 1985 (now U.S. Pat. No. 4,605,731), and Ser. No. 888,673, filed July 24, 1986. THe disclosure of the above-listed patents and applications are incorporated by reference herein. The polycarbonate formation catalysts disclosed as useful in said applications include various bases and Lewis acids, as noted hereinafter.

Conversions of this type have high potential for utilization in reactive processing methods, such as polymerization in a mold for direct production of molded articles, and for the formation of composite prepregs which may be polymerized to thermoplastic composites. One reason for this is the low melt viscosity of the oligomer mixtures, as a result of which handling thereof is simple and convenient.

When polymerization is to be achieved as described in the aforementioned applications, there are relatively few parameters which can be used to control polymerization temperature and rate. Polymerization is generally initiated when the oligomer-catalyst composition reaches a threshold temperature at which dissolution or dispersion of the catalyst is attained, and is complete in a time period as short as five minutes.

Control of polymerization rate is important in some polymerization processes. For example, such operations as the molding of large parts and the formation of high performance composites could be facilitated if a method for controlling said rate were available.

By the present invention, a method is provided for controlling the polymerization rate of cyclic polycarbonate oligomers to linear polycarbonates. In particular, the polymerization rate may be decreased. Methods are also provided for modifying the polycarbonate formation reaction so as to facilitate its use under a wide variety of conditions. Moreover, modified polycarbonate formation catalyst compositions which can accomplish the foregoing are provided.

In one of its aspects, the present invention is a method for controlling the polymerization rate of a cyclic polycarbonate oligomer composition to linear polycarbonates, upon contact with a polycarbonate formation catalyst, which comprises:

encapsulating said catalyst in a thermoplastic polymer which is soluble or stably dispersible in said oligomer composition at elevated temperatures, thereby producing a composition consisting essentially of said catalyst and polymer;

blending the polymer-encapsulated catalyst with said oligomer composition at a temperature substantially below the polymerization temperature of said oligomer composition; and heating the blend thus obtained to at least the polymerization temperature of said oligomer composition, whereupon said polymer dissolves or disperses and said catalyst comes into contact with said oligomer composition and causes polymerization thereof.

The cyclic polycarbonate oligomers which are polymerized according to the present invention include those comprising structural units of the formula

wherein at least about 60% of the total number of $R^1$ values are aromatic organic radicals and the balance thereof are aliphatic, alicyclic or aromatic organic radicals. They also include cyclic heterocarbonates of the type disclosed in copending, commonly owned application Ser. No. 890,053, filed July 28, 1986, the disclosure of which is also incorporated by reference herein. Most often, however, the oligomers are dimers, trimers and tetramers of the type disclosed in the aforementioned U.S. patents, including oligomer mixtures disclosed in the aforementioned European application. The oligomer mixtures are especially preferred.

The $R^1$ values may be different but are usually the same; those which are aliphatic or alicyclic generally contain up to about 8 carbon atoms. They may contain substituents such as halo, nitro, alkoxy and the like. Most often, however, all $R^1$ radicals are hydrocarbon radicals.

Preferably at least about 80% of the total number of $R^1$ values in the cyclic oligomer mixtures, and most desirably all of said $R^1$ values, are aromatic. The aromatic $R^1$ radicals preferably have the formula

wherein each of $A^1$ and $A^2$ is a monocyclic divalent aromatic radical and Y is a bridging radical in which one or two atoms separate $A^1$ from $A^2$. The free valence bonds in formula II are usually in the meta or para positions of $A^1$ and $A^2$ in relation to Y.

In formula II, the $A^1$ and $A^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated radical such as methylene, cyclohexylmethylene, 2-[2.2.1]bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone.

The $R^1$ values may be considered as being derived from dihydroxy compounds of the formula HO—$R^1$—OH (or the corresponding dithio compounds), especially dihydroxyaromatic compounds and preferably bisphenols of the formula HO—$A^1$—Y—$A^2$—OH. The following dihydroxy compounds are illustrative:
Ethylene glycol
Propylene glycol
1,3-Propanediol
1,4-Butanediol
1,6-Hexanediol
1,12-Dodecanediol
2-Ethyl-1,10-decanediol
2-Butene-1,4-diol
1,3-Cyclopentanediol
1,3-Cyclohexanediol
1,4-Cyclohexanediol
1,4-Bis(hydroxymethyl)benzene (which is a vinylog of ethylene glycol and has similar properties)
Resorcinol
4-Bromoresorcinol
Hydroquinone
4,4'-Dihydroxybiphenyl
1,6-Dihydroxynaphthalene
2,6-Dihydroxynaphthalene
Bis(4-hydroxyphenyl)methane
Bis(4-hydroxyphenyl)diphenylmethane
Bis(4-hydroxyphenyl)-1-naphthylmethane
1,1-Bis(4-hydroxyphenyl)ethane
1,2-Bis(4-hydroxyphenyl)ethane
1,1-Bis(4-hydroxyphenyl)-1-phenylethane
2,2-Bis(4-hydroxyphenyl)propane ("bisphenol A")
2-(4-Hydroxyphenyl)-2-(3-hydroxyphenyl)propane
2,2-Bis(4-hydroxyphenyl)butane
1,1-Bis(4-hydroxyphenyl)isobutane
1,1-Bis(4-hydroxyphenyl)cyclohexane
1,1-Bis(4-hydroxyphenyl)cyclododecane
Trans-2,3-bis(4-hydroxyphenyl)-2-butene
2,2-Bis(4-hydroxyphenyl)adamantane
α,α'-Bis(4-hydroxyphenyl)toluene
Bis(4-hydroxyphenyl)acetonitrile
2,2-Bis(3-methyl-4-hydroxyphenyl)propane
2,2-Bis(3-ethyl-4-hydroxyphenyl)propane
2,2-Bis(3-n-propyl-4-hydroxyphenyl)propane
2,2-Bis(3-isopropyl-4-hydroxyphenyl)propane
2,2-Bis(3-sec-butyl-4-hydroxyphenyl)propane
2,2-Bis(3-t-butyl-4-hydroxyphenyl)propane
2,2-Bis(3-cyclohexyl-4-hydroxyphenyl)propane
2,2-Bis(3-allyl-4-hydroxyphenyl)propane
2,2-Bis(3-methoxy-4-hydroxyphenyl)propane
2,2-Bis(3,5-dimethyl-4-hydroxyphenyl)propane
2,2-Bis(2,3,5,6-tetramethyl-4-hydroxyphenyl)propane
2,2-Bis(3,5-dichloro-4-hydroxyphenyl)propane
2,2-Bis(3,5-dibromo-4-hydroxyphenyl)propane
2,2-Bis(2,6-dibromo-3,5-dimethyl-4-hydroxyphenyl)propane
α,α-Bis(4-hydroxyphenyl)toluene
α,α,α',α'-Tetramethyl-α,α'-bis(4-hydroxyphenyl)-p-xylene
2,2-Bis(4-hydroxyphenyl)hexafluoropropane
1,1-Dichloro-2,2-bis(4-hydroxyphenyl)ethylene
1,1-Dibromo-2,2-bis(4-hydroxyphenyl)ethylene
1,1-Dichloro-2,2-bis(5-phenoxy-4-hydroxyphenyl)ethylene
4,4'-Dihydroxybenzophenone
3,3-Bis(4-hydroxyphenyl)-2-butanone
1,6-Bis(4-hydroxyphenyl)-1,6-hexanedione
Ethylene glycol bis(4-hydroxyphenyl) ether
Bis(4-hydroxyphenyl) ether
Bis(4-hydroxyphenyl) sulfide
Bis(4-hydroxyphenyl) sulfoxide
Bis(4-hydroxyphenyl) sulfone
Bis(3,5-dimethyl-4-hydroxyphenyl) sulfone
9,9-Bis(4-hydroxyphenyl)fluorene
2,7-Dihydroxypyrene
6,6'-Dihydroxy-3,3,3',3'-tetramethylspiro(bis)indane ("spirobiindane bisphenol")
3,3-Bis(4-hydroxyphenyl)phthalide
2,6-Dihydroxydibenzo-p-dioxin
2,6-Dihydroxythianthrene
2,7-Dihydroxyphenoxathiin
2,7-Dihydroxy-9,10-dimethylphenazine
3,6-Dihydroxydibenzofuran
3,6-Dihydroxydibenzothiophene
2,7-Dihydroxycarbazole.

Bisphenol A is often preferred for reasons of availability and particular suitability for the purposes of the invention.

The cyclic oligomer mixtures consist essentially of oligomers having degrees of polymerization from 2 to about 30 and preferably to about 20, with a major proportion being up to about 12 and a still larger proportion up to about 15. Since they are mixtures of oligomers having varying degrees of polymerization, these compositions have relatively low melting points as compared to single compounds such as the corresponding cyclic trimer. The cyclic oligomer mixtures are generally liquid at temperatures above 300° C. and most often at temperatures above 225° C.

Such cyclic oligomer mixtures may be prepared by a condensation reaction involving at least one bishaloformate having the formula

$$R^1(OCOX)_2, \qquad (III)$$

or a mixture thereof with at least one bis(active hydrogen) compound having the formula

$$R^1(OH)_2, \qquad (IV)$$

wherein $R^1$ is as defined hereinabove and X is chlorine or bromine. (The compound of formula III or mixture thereof with that of formula IV is frequently referred to hereinafter as "bishaloformate composition" or "bischloroformate composition".) The condensation reaction typically takes place interfacially when a solution of said compound in a substantially non-polar organic liquid is contacted with a tertiary amine from a specific class and an aqueous alkali metal hydroxide solution.

In addition to compounds of formula III and, optionally, formula IV, the bishaloformate composition may also contain other compounds, including oligomers of the formula

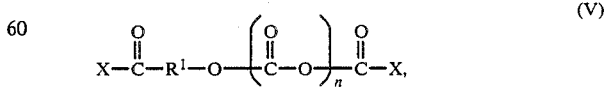

(V)

wherein $R^1$ and X are as previously defined and n is a small number, typically about 1–4.

While the X values in formula III may be chlorine or bromine, the bischloroformates, in which X is chlorine, are most readily available and their use is therefore preferred. (Frequent reference to bischloroformates will be made hereinafter, but it should be understood that other bishaloformates may be substituted therefor as appropriate.) Suitable bis(active hydrogen) compounds of formula IV include diols having divalent radicals of formula II which are different from the corresponding divalent radicals in the compound of formula III, as well as other dihydroxyaromatic compounds. When such bis(active hydrogen) compounds are present, they generally comprise up to about 50%, most often up to about 20% and preferably up to about 10%, of the bischloroformate mixture. Most preferably, however, said mixture consists essentially of bischloroformates. Any cyclic oligomers containing divalent aliphatic radicals (or their vinylogs) flanked by two oxygen atoms are prepared by using a mixture of compounds of formulas III and IV.

The tertiary amines useful as in the oligomer formation reaction ("tertiary" in this context denoting the absence of N—H bonds) generally comprise those which are oleophilic; i.e., which are soluble in and highly active in organic media, especially those used in the oligomer preparation method, and in particular those which are useful for the formation of polycarbonates. Reference is made, for example, to the tertiary amines disclosed in U.S. Pat. Nos. 4,217,438 and 4,368,315, the disclosures of which are incorporated by reference herein. They include aliphatic amines such as triethylamine, tri-n-propylamine, diethyl-n-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and bischloroformate composition is essential for the formation of the cyclic oligomer mixture. For the most part, such amines contain at least about 6 and preferably about 6-14 carbon atoms.

The most useful amines are trialkylamines containing no branching on the carbon atoms in the 1- and 2-positions. Especially preferred are tri-n-alkylamines in which the alkyl groups contain up to about 4 carbon atoms. Triethylamine is most preferred by reason of its particular availability, low cost, and effectiveness in the preparation of products containing low percentages of linear oligomers and high polymers.

Also employed in the oligomer formation reaction is an aqueous alkali or alkaline earth metal hydroxide or carbonate solution. It is most often lithium, sodium or potassium hydroxide, with sodium hydroxide being preferred because of its availability and relatively low cost. The concentration of said solution may be about 0.1-16M.

The fourth essential component in the cyclic oligomer preparation method is a substantially non-polar organic liquid which forms a two-phase system with water. The identity of the liquid is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran.

To prepare the cyclic oligomer mixture according to the above-described method, the reagents and components are placed in contact under conditions wherein the bischloroformate composition is present in high dilution, or equivalent conditions. Actual high dilution conditions, requiring a large proportion of organic liquid, may be employed but are usually not preferred for cost and convenience reasons. Instead, simulated high dilution conditions known to those skilled in the art may be employed. For example, in one embodiment of the method the bischloroformate composition or a mixture thereof with the amine is added gradually to a mixture of the other materials. It is within the scope of this embodiment to incorporate the amine in the mixture to which the bischloroformate is added, or to add it gradually, either in admixture therewith or separately. Continuous or incremental addition of amine is frequently preferred, whereupon the cyclic oligomer mixture is obtained in relatively pure form and in high yield.

Although addition of bischloroformate composition neat (i.e., without solvents) is within the scoipe of this embodiment, it is frequently inconvenient because many bischloroformates are solids. Therefore, it is preferably added as a solution in a portion of the organic liquid, especially when it consists essentially of bischloroformate. The proportion of organic liquid used for this purpose is not critical; about 25-75% by weight, and especially about 40-60%, is preferred.

The reaction temperature is generally in the range of about 0°-50° C. It is most often about 0°-40° C. and preferably 20°-40° C.

For maximization of the yield and purity of cyclic oligomers as opposed to polymer and insoluble and/or intractable by-products, it is preferred to use not more than about 0.7 mole of bischloroformate composition (calculated as bisphenol bischloroformate) per liter of organic liquid present in the reaction system, including any liquid used to dissolve said composition. Preferably, about 0.003-0.6 mole thereof is used when it consists entirely of bischloroformate, and no more than about 0.5 mole is used when it is a mixture of compounds of formulas III and IV. It should be noted that this is not a molar concentration in the organic liquid when the bischloroformate composition is added gradually, since said composition is consumed as it is added to the reaction system.

The molar proportions of the reagents constitute another important feature for yield and purity maximization. The preferred molar ratio of amine to bischloroformate composition (calculated as bisphenol bischloroformate) is about 0.1-1.0:1 and most often about 0.2-0.6:1. The preferred molar ratio of alkali metal hydroxide to said composition is about 1.5-3:1 and most often about 2-3:1.

If necessary, the oligomer mixture may be separated from at least a portion of the polymer and insoluble material present. When other reagents are added to the alkali metal hydroxide solution and the preferred conditions and material proportions are otherwise employed, the cyclic oligomer mixture (obtained as a solution in the organic liquid) typically contains less than 30% by weight and frequently less than about 20% of polymer and insoluble material. When all of the preferred conditions are employed, the product may contain 10% or even less of such material. Depending on the intended use of the cyclic oligomer mixture, the separation step may then be unnecessary.

Therefore, a highly preferred method for preparing the cyclic oligomer mixture comprises the single step of conducting the reaction using at least one aliphatic or heterocyclic tertiary amine which, under the reaction conditions, dissolves preferentially in the organic phase of the reaction system, and gradually adding all the reagents simultaneously to a substantially non-polar organic liquid or a mixture of said liquid with water, said liquid or mixture being maintained at a temperature in the range of about 0°–50° C.; the amount of bischloroformate composition used being up to about 0.7 mole for each liter of said organic liquid present in the reaction system, and the molar proportions of amine and alkali metal hydroxide to bischloroformate composition being approximately 0.2–1.0:1 and 2–3:1, respectively; and recovering the cyclic oligomers thus formed.

As in the embodiment previously described, another portion of said liquid may serve as a solvent for the bischloroformate composition. Addition of each reagent is preferably continuous, but may be incremental for any or all of said reagents.

Among the principal advantages of this preferred embodiment are the non-criticality of the degree of dilution of the reagents and the ability to complete the addition and reaction in a relatively short time, regardless of reaction scale. It ordinarily takes only about 25–30 minutes to complete cyclic oligomer preparation by this method, and the cyclic oligomer yield may be 85–90% or more. The crude product usually also contains only minor amounts of high molecular weight linear polycarbonates as by-products. By contrast, use of a less preferred embodiment may, depending on reaction scale, require an addition period as long as 8–10 hours and the crude product may contain substantial proportions of linear by-products with molecular weights of about 4,000–10,000, which, if not removed, may interfere with subsequent polymerization of the cyclic oligomers by acting as chain transfer agents.

It is believed that the advantageous results obtained by employing the preferred embodiment are a result of the relatively low pH of the reaction mixture, typically about 9–10. When bischloroformate composition (and optionally amine) is added to alkali metal hydroxide, on the other hand, the initial pH is on the order of 14.

When the polymer separation step is necessary, the unwanted impurities may be removed in the necessary amounts by conventional operations such as combining the solution with a non-solvent for said impurities. Illustrative non-solvents include ketones such as acetone and methyl isobutyl ketone and esters such as methyl acetate and ethyl acetate. Acetone is a particularly preferred non-solvent.

Recovery of the cyclic oligomers normally means merely separating the same from diluent (by known methods such as vacuum evaporation) and, optionally, from high polymer and other impurities. As previously suggested, the degree of sophistication of recovery will depend on such variables as the intended end use of the product.

The preparation of cyclic oligomer mixtures useful in this invention is illustrated by the following examples. All parts and percentages in the examples herein are by weight unless otherwise indicated. Temperatures are in degrees Celsius. Molecular weights, whenever referred to herein, are weight average unless otherwise indicated and were determined by gel permeation chromatography relative to polystyrene.

EXAMPLES 1–18

Bisphenol A bischloroformate was reacted with aqueous sodium hydroxide and triethylamine in an organic liquid (chloroform in Example 7, methylene chloride in all other examples) according to the following procedure: The bischloroformate was dissolved in half the amount of organic liquid employed and was added gradually, with slow stirring, to the balance of the reaction mixture. In Examples 1–10 and 12, the triethylamine was all originally present in the reaction vessel; in Examples 14–16, it was added gradually at the same time as the bischloroformates; and in Examples 11, 13, 17 and 18, it was added incrementally at the beginning of bischloroformate addition and at intervals of 20% during said addition. The amount of sodium hydroxide used was 2.4 moles per mole of bischloroformate. After all the bischloroformate had been added, the mixture was stirred for about 2 minutes and the reaction was quenched by the addition of a slight excess of 1M aqueous hydrochloric acid. The solution in the organic liquid was washed twice with dilute aqueous hydrochloric acid, dried by filtration through phase separation paper and evaporated under vacuum. The residue was dissolved in tetrahydrofuran and high polymers were precipitated by addition of acetone.

The reaction conditions for Examples 1–18 are listed in Table I together with the approximate percentage (by weight) of cyclic polycarbonate oligomer present in the product before high polymer precipitation. The weight average molecular weights of the cyclic oligomer mixtures were approximately 1300, corresponding to an average degree of polymerization of about 5.1.

TABLE 1

| Example | Bischloroformate amt., mmole/l. org. liquid | Bischloroformate amt., total mmol. | NaOH molarity | Molar ratio, amine:bischloroformate | Temperature | Addition time, min. | % oligomer in product |
|---|---|---|---|---|---|---|---|
| 1 | 100 | 2 | 0.313 | 0.5 | 20 | 30 | 97 |
| 2 | 100 | 2 | 0.625 | 0.5 | 20 | 30 | 95 |
| 3 | 100 | 2 | 2.5 | 0.5 | 35 | 55 | 93 |
| 4 | 100 | 2 | 2.5 | 0.5 | 0 | 30 | 77 |
| 5 | 100 | 2 | 2.5 | 0.5 | 20 | 30 | 87 |
| 6 | 100 | 2 | 2.5 | 0.5 | 35 | 30 | 78 |
| 7 | 100 | 2 | 2.5 | 0.5 | 50 | 30 | 88 |
| 8 | 100 | 2 | 2.5 | 0.25 | 20 | 30 | 74 |
| 9 | 100 | 1 | 2.5 | 0.2 | 20 | 15 | 75 |
| 10 | 200 | 4 | 2.5 | 0.5 | 20 | 30 | 88 |
| 11 | 500 | 10 | 2.5 | 0.25 | 25 | 105 | 83 |
| 12 | 500 | 10 | 2.5 | 0.25 | 25 | 105 | 78 |
| 13 | 500 | 10 | 2.5 | 0.25 | 25 | 105 | 83 |

TABLE 1-continued

| Example | Bischloroformate amt., mmole/l. org. liquid | Bischloroformate amt., total mmol. | NaOH molarity | Molar ratio, amine:bischloroformate | Temperature | Addition time, min. | % oligomer in product |
|---|---|---|---|---|---|---|---|
| 14 | 500 | 10 | 2.5 | 0.25 | 25 | 105 | 87 |
| 15 | 500 | 10 | 2.5 | 0.29 | 30 | 90 | 78 |
| 16 | 500 | 10 | 2.5 | 0.25 | 30 | 20 | 75 |
| 17 | 500 | 10 | 2.5 | 0.25 | 40–45 | 105 | 79 |
| 18 | 500 | 10 | 2.5 | 0.4 | 25 | 105 | 79 |

EXAMPLE 19

Bisphenol A bischloroformate (2.0 mmol.) was reacted with aqueous sodium hydroxide and 4-dimethylaminopyridine in methylene chloride. The procedure employed was that of Example 1, except that 66.67 mmol. of bisphenol A per liter of methylene chloride was employed, the aqueous sodium hydroxide concentration was 5.0M and the reaction temperature was about 25° C. The product comprised 85% cyclic oligomer.

EXAMPLE 20

A solution of 1.4 mmol. of bisphenol A bischloroformate and 0.6 mmol. of 1,4-benzenedimethanol bischloroformate in 10 ml. of a tetrahydrofuran-methylene chloride solution comprising 10% by volume tetrahydrofuran was added over 30 minutes at 30° C., with stirring, to a mixture of 10 ml. of methylene chloride, 2 ml. of 2.5M aqueous sodium hydroxide and 1 mmol. of triethylamine. After addition was complete, the mixture was washed three times with dilute aqueous hydrochloric acid and the organic layer was separated, dried by filtration through phase separation paper and evaporated under vacuum. The product was the desired mixed cyclic polycarbonate oligomer of bisphenol A and benzene1,4-dimethanol.

EXAMPLES 21-31

Following the procedure of Example 20, products containing at least about 80% mixed cyclic polycarbonate oligomers were prepared from mixtures of bisphenol A bischloroformate and the dihydroxy compounds listed in Table II. In each case, a total of 2 mmol. of reagent A was used. The proportion of the listed dihydroxy compound was 10 mole percent unless otherwise indicated.

TABLE II

| Example | Dihydroxy compound |
|---|---|
| 21 | 1,1-Bis(4-hydroxyphenyl)cyclohexane |
| 22 | 1,1-Bis(4-hydroxyphenyl)cyclododecane |
| 23 | 2,2-Bis(3,5-dimethyl-4-hydroxyphenyl)propane |
| 24 | 2,2-Bis(3,5-dibromo-4-hydroxyphenyl)propane |
| 25 | 2,2-Bis(4-hydroxyphenyl)-1,1-dichloroethylene |
| 26 | Hydroquinone |
| 27 | Hydroquinone (15 mole percent) |
| 28 | Ethylene glycol bis(4-hydroxyphenyl) ether |
| 29 | Bis(4-hydroxyphenyl) sulfide |
| 30 | Bis(4-hydroxyphenyl) sulfone |
| 31 | Bis(3,5-dimethyl-4-hydroxyphenyl) sulfone |

EXAMPLE 32

The crude bischloroformate composition used was a bisphenol A bischloroformate composition corresponding roughly to the dimer.

A 300-ml. Morton flask was charged with 128 ml. of methylene chloride, 10 ml. of water, 2 ml. of 4.9M aqueous sodium hydroxide, 1.16 ml. of triethylamine and 5 ml. of 0.66M aqueous disodium salt of bisphenol A. The mixture was heated under reflux, with stirring, as 40 ml. of a 1.06M solution of the bischloroformate in methylene chhloride was added over 37 minutes. There were concurrently added an additional 35 ml. of the bisphenol A disodium salt solution over 32 minutes, 10 ml. of sodium hydroxide solution over 30 minutes, and 0.36 ml. of triethylamine in 10 equal increments 3½ minutes apart. Stirring was continued for several minutes, after which the aqueous and organic phases were separated and the aqueous layer was washed with methylene chloride. The combined organic phases were washed once with dilute aqueous sodium hydroxide, twice with aqueous hydrochloric acid, once again with sodium hydroxide and twice with water, and dried over magnesium sulfate. Upon filtration, vacuum stripping and drying in an oven, there was obtained a white solid comprising the desired cyclic oligomer mixture, containing about 89% cyclic oligomers.

The polymerization of the above-described cyclic polycarbonate oligomers involves the use of a polycarbonate formation catalyst. Such catalysts include various bases and Lewis acids. It is known that basic catalysts may be used to prepare polycarbonates by the interfacial method, as well as by transesterification and from cyclic oligomers. Such catalysts may also be used to polymerize the cyclic oligomer mixtures. Examples thereof are lithium 2,2,2-trifluoroethoxide, n-butyllithium and tetramethylammonium hydroxide. Also useful are various weakly basic salts such as sodium benzoate and lithium stearate.

Lewis acids useful as polycarbonate formation catalysts are selected from non-halide compounds and include dioctyltin oxide, triethanolaminetitanium isopropoxide, tetra(2-ethylhexyl) titanate and polyvalent metal (especially titanium and aluminum) chelates such as bisisopropoxytitanium bisacetylacetonate (commercially available under the tradename "Tyzor AA") and the bisisopropoxyaluminum salt of ethyl acetoacetate. Among the preferred catalysts are lithium sterarate and bisisopropoxytitanium bisacetylacetonate.

Also useful as polycarbonate formation catalysts are coordination compounds represented by the formula

  (VI)

wherein M is one equivalent of a cation other than hydrogen and Z is an aromatic radical or two Z values taken together form a divalent aromatic radical.

The M value may be any metal cation, with alkali metals, especially lithium, sodium and potassium, being preferred. More desirably however, it has the formula

  (VII)

wherein each $R^2$ is independently a $C_{1-4}$ primary alkyl or $C_{6-10}$ aryl radical, preferably alkyl and most desirably methyl, and Q is nitrogen, phosphorus or arsenic.

The Z values in formula VI may be phenyl radicals or substituted phenyl radicals wherein the substituents may be $C_{1-4}$ alkyl, aryl, halo, nitro, $C_{1-4}$ alkoxy or the like. Any substituents are preferably electron-withdrawing groups such as halo or nitro, but unsubstituted phenyl radicals are most preferred. It is also possible for two Z values together to form a divalent radical such as 2,2'-biphenylene.

Thus, it will be apparent to those skilled in the art that suitable catalytic species include such compounds as lithium tetraphenylborate, sodium tetraphenylborate, sodium bis(2,2'-biphenylene)borate, potassium tetraphenylborate, tetramethylammonium tetraphenylborate, tetra-n-butylammonium tetraphenylborate, tetramethylphosphonium tetraphenylborate, tetra-n-butylphosphonium tetraphenylborate and tetraphenylphosphonium tetraphenylborate. As between these and similar catalysts, the choice may be dictated by such factors as the desired rate of reaction and the chemical nature of the oligomer composition being polymerized. For the preparation of aromatic polycarbonates such as bisphenol A polycarbonate, preferred catalysts are the tetra-n-alkylammonium and tetra-n-alkylphosphonium tetraphenylborates. Tetramethylammonium tetraphenylborate is particularly preferred because of its high activity, relatively low cost and ease of preparation from tetramethylammonium hydroxide and an alkali metal tetraphenylborate.

According to the present invention, the catalyst is encapsulated in a thermoplastic polymer. It should be noted that the invention does not include encapsulation in a linear polycarbonate-rich cyclic oligomer composition, which is disclosed and claimed in the aforementioned copending, commonly owned application Ser. No. 888,673. Rather, this invention contemplates encapsulation in a material consisting essentially of a polymer as described herein.

Polymers suitable for encapsulation will be apparent to those skilled in the art. They must be soluble or stably dispersible in the cyclic oligomer composition but their solubility or dispersibility therein need not be high, since only a minor proportion of said polymer will be present. Also, the catalyst need not be soluble in the polymer, although solubility may be preferred; it is sufficient if it is stably dispersible therein to form a composition of substantially uniform catalyst concentration upon solidification.

Suitable polymers include linear polycarbonates (especially polycarbonates containing structural units different from the units in the cyclic polycarbonate oligomer composition), polyetherimides, polyethersulfones and linear polyesters such as poly(butylene terephthalate). The linear polyesters frequently undergo ester-carbonate interchange with the polycarbonates, a reaction which may be detrimental under certain circumstances but which is not so in the present instance, since it facilitates contact of the catalyst with the cyclic oligomer mixture and the proportion of polyester is not so high as to cause substantial polycarbonate degradation.

Encapsulation may be achieved by blending the catalyst with the polymer in solution or in the melt. Upon cooling or solvent evaporation, the polymer solidifies or congeals with the catalyst encapsulated therein, and may be pulverized or otherwise comminuted to facilitate blending with the cyclic oligomer composition. The proportion of catalyst in encapsulating polymer is not critical and may be, for example, about 5–15% by weight. Compositions consisting essentially of the catalyst encapsulated in said polymer are another aspect of the invention.

The polymer-encapsulated catalyst is then blended with the oligomer composition, at a temperature below the polymerization temperature thereof. Melt blending or solvent blending may be feasible when the encapsulating polymer is not soluble in the oligomer composition; however, if it is soluble polymerization will immediately begin in the case of melt blending, and the whole purpose of encapsulation will be frustrated in the case of solvent blending. In any event melt or solvent blending are usually not preferred. Conventional dry blending techniques are normally employed.

Finally, the blend of the cyclic oligomer composition with the encapsulated catalyst is heated to at least the polymerization temperature of said oligomer composition. Such temperatures will be above the melting point of the oligomer composition and above the point at which dissolution or dispersion of the encapsulating polymer therein takes place. The principal object during this heating step is to achieve programmed gradual dissolution or dispersion of the encapsulating polymer in the oligomer composition, which is inevitably accompanied by catalyst contact with said composition.

Various factors may effect the conditions of oligomer polymerization according to this invention. One is the glass transition temperature of the encapsulating polymer, or its equilibrium melting temperature if it is highly crystalline. Said polymer must dissolve or become dispersed in the cyclic oligomer composition for contact of said composition with the catalyst and initiation of polymerization. This may be achieved by attaining a temperature above the glass transition or melting temperature of the encapsulating polymer, which may be somewhat lower in contact with the oligomer composition than otherwise.

The melt viscosity of the encapsulant will also have an effect. If said viscosity is high, dissolution or dispersion will proceed more slowly than if it is lower.

The degree of agitation, if any, of the polymerization mixture may also be important. If the encapsulated polymer and oligomer composition have been dry blended intimately enough, little or no agitation may be required. On the other hand, extremely vigorous agitation (typical of such operations as extrusion and injection molding) may cause substantial shearing of the encapsulating polymer, thus accelerating both contact of the catalyst with the oligomer composition and polymerization.

By varying the polymerization temperature, agitation rate, melt viscosity and glass transition temperature or melting temperature of the encapsulating polymer, the polymerization rate may be controlled as desired. Polymerization temperatures in the range of about 225°–300° C. are typical.

In general, the amount of catalyst used is about 0.001–1.0 mole percent based on structural units in the oligomer composition. The use of a solvent during polymerization is likewise within the scope of the invention but is generally not preferred. The conditions of the polymerization reaction may be varied to produce resinous compositions of various molecular weights.

The molecular weight of the polymerization product can be controlled by varying the amount of catalyst, with a decrease in said amount generally resulting in an increase in molecular weight, or by employing known chain transfer agents, of which diphenyl carbonate is an example, typically in amounts up to about 2.5 mole percent based on structural units in the oligomer mixture. Among the processing operations which can be conducted simultaneously with polymerization are various extrusion and molding operations. Thus, the cyclic oligomer composition may be combined with encapsulated catalyst and fed to an extruder which is maintained at polymerization temperature. The effluent from the extruder is then a polycarbonate in the desired sheet, rod or other form. The molecular weight of the product may be adjusted over a wide range by methods described hereinabove.

Similarly, the cyclic oligomer composition may be combined with encapsulated catalyst and injection molded at polymerization temperatures. Said compositions also have flow properties adequate for rotational molding simultaneous with polymerization. These capabilities make it possible to employ them in operations previously unavailable with respect to polycarbonates.

The invention is illustrated by the following example.

EXAMPLE 33

A solution was prepared by stirring, at 32° C., a mixture of 90 ml. of methylene chloride, 660 mg. of tetra-n-butylammonium tetraphenylborate and 9 grams of a polyetherimide having a number average molecular weight of about 20,000 and prepared by the reaction of m-phenylenediamine with 2,2-bis[4-(3,4-dicarboxyphenoxy)phenyl]propane dianhydride. The resulting solution was fed to a centrifugal casting apparatus operated at 42° C., whereupon the methylene chloride evaporated to yield a light brown two-phase film of polyetherimide-encapsulated catalyst. Said encapsulated catalyst was then pulverized.

An intimate mixture was prepared by dry blending of 50 grams (196.9 mmol.) of a cyclic bisphenol A polycarbonate mixture similar to that of Example 32, 837 mg. (3.9 mmol.) of diphenyl carbonate and 836 mg. of the polyetherimide-encapsulated catalyst, containing 66 mg. (0.18 mmol.) of catalyst. The resulting blend was divided into two samples, one being polymerized at 250° C. and the other at 300° C. in a twin-beater melt blender. Comparison was made with controls in which an equivalent amount of non-encapsulated catalyst was employed. Samples were removed after various time periods and analyzed for percent polymer by gel permeation chromatography. The results are listed in Table III.

TABLE III

| Time, min. | % polymerization | | | |
|---|---|---|---|---|
| | 250° C. | Control | 300° C. | Control |
| 5 | — | 100 | — | 100 |
| 15 | 0 | — | 40 | — |
| 30 | 10 | — | 97 | — |
| 60 | 98 | — | — | — |

What is claimed is:

1. A method for controlling the polymerization rate of a cyclic polycarbonate oligomer composition to linear polycarbonates, upon contact with a polycarbonate formation catalyst, which comprises:

encapsulating said catalyst in a thermoplastic polymer selected from the group consisting of linear polycarbonates, polyetherimides, polyethersulfones and linear polyesters, thereby producing a composition consisting essentially of said catalyst and polymer;

blending the polymer-encapsulated catalyst with said oligomer composition at a temperature substantially below the polymerization temperature of said oligomer composition; and heating the blend thus obtained to at least the polymerization temperature of said oligomer composition, whereupon said polymer dissolves or disperses and said catalyst comes into contact with said oligomer composition and causes polymerization thereof.

2. A method according to claim 1 wherein the cyclic polycarbonate oligomers comprise structural units of the formula $$-O-R^1-O-\overset{O}{\underset{\|}{C}}-, \qquad (I)$$

wherein at least 60% of the total number of $R^1$ values are aromatic organic radicals and the balance thereof are aliphatic, alicyclic or aromatic organic radicals.

3. A method according to claim 2 wherein a cyclic polycarbonate oligomer mixture is employed.

4. A method according to claim 3 wherein the catalyst is a base or a non-halide-containing Lewis acid.

5. A method according to claim 4 wherein all of the $R^1$ radicals are aromatic.

6. A method according to claim 5 wherein the $R^1$ radicals have the formula $$-A^1-Y-A^2-, \qquad (II)$$

wherein each of $A^1$ and $A^2$ is a monocyclic divalent aromatic radical and Y is a bridging radical in which one or two atoms separate $A^1$ from $A^2$.

7. A method according to claim 6 wherein polymerization is effected at a temperature in the range of about 225°–300° C.

8. A method according to claim 7 wherein the polycarbonate formation catalyst is a coordination compound having the formula $$M^{\oplus}BZ_4^{\ominus}, \qquad (VI)$$

wherein M is one equivalent of a cation other than hydrogen and Z is an aromatic radical or two Z values taken together form a divalent aromatic radical.

9. A method according to claim 8 wherein each of $A^1$ and $A^2$ is p-phenylene and Y is isopropylidene.

10. A method according to claim 9 wherein the polymer is a polyetherimide.

11. A method according to claim 10 wherein the polycarbonate formation catalyst is a tetra-n-alkylammonium tetraphenylborate.

* * * * *